Sept. 22, 1931.  E. KARRER  1,823,980
STEERING WHEEL
Filed Dec. 22, 1928  2 Sheets-Sheet 1
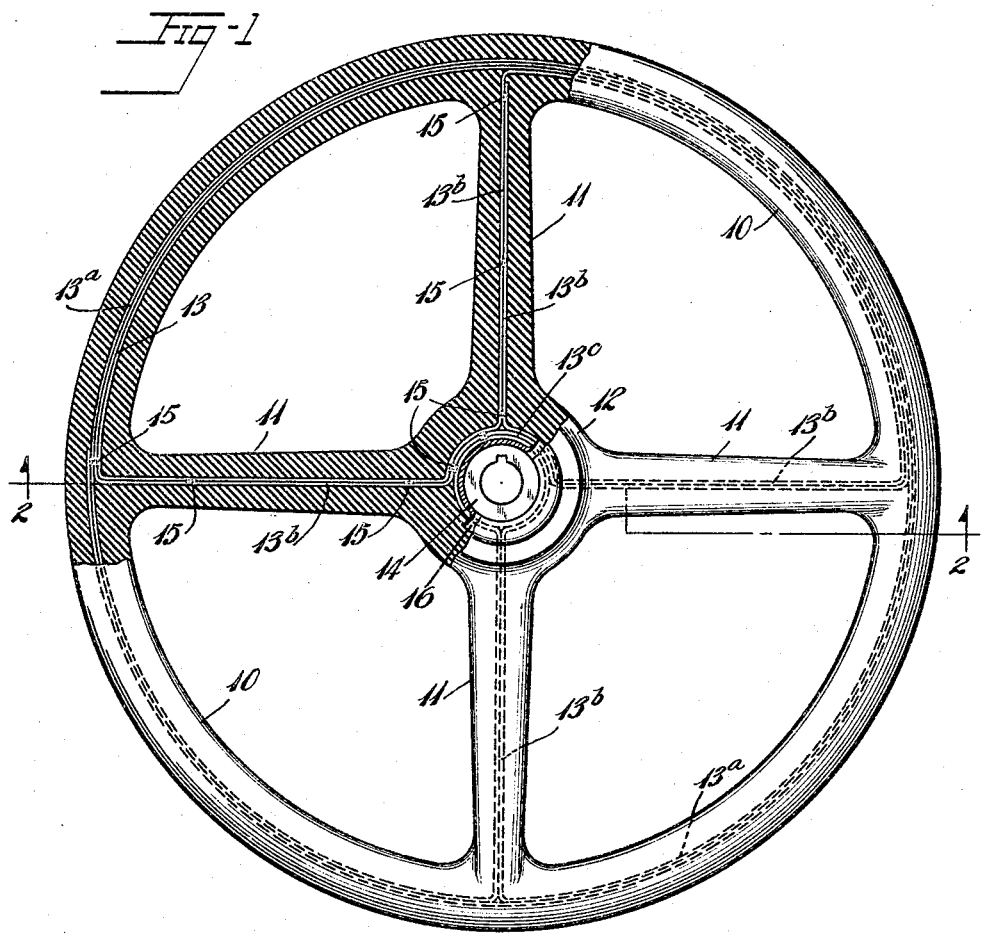
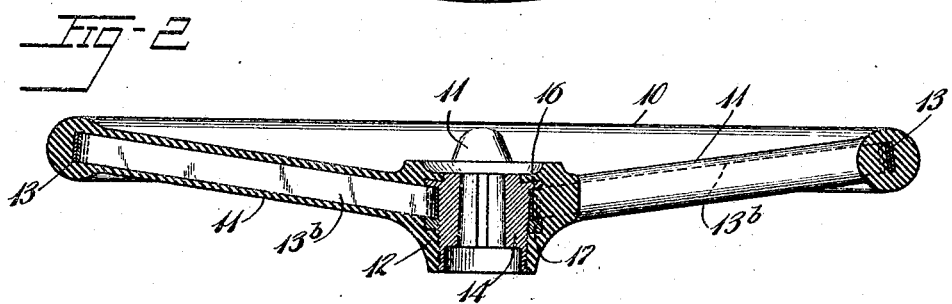
Inventor
Enoch Karrer
By Eakin & Avery Attys Inventor
Enoch Karrer
By Eakin & Avery
Attys Patented Sept. 22, 1931

1,823,980

UNITED STATES PATENT OFFICE

ENOCH KARRER, OF AKRON, OHIO, ASSIGNOR TO THE B. F. GOODRICH COMPANY, OF NEW YORK, N. Y., A CORPORATION OF NEW YORK

STEERING WHEEL

Application filed December 22, 1928. Serial No. 327,946.

This invention relates to steering wheels such as commonly are used with motor-driven vehicles, and to methods of making the same, and especially it relates to steering wheels of the character mentioned which are composed of a molded composition, such as hard rubber or the like and provided with internal reinforcement.

It is the chief object of the invention to provide an improved reinforcement for steering wheels which reinforcement may be made without waste of material, and to provide a simple method of making said reinforcement. A more specific object is to provide a laminated steering wheel reinforcement having integral rim, spoke, and hub portions.

Of the accompanying drawings:

Fig. 1 is a plan view of a steering wheel embodying my invention in its preferred form, a part being in section.

Fig. 2 is a section on line 2—2 of Fig. 1.

Figure 3:
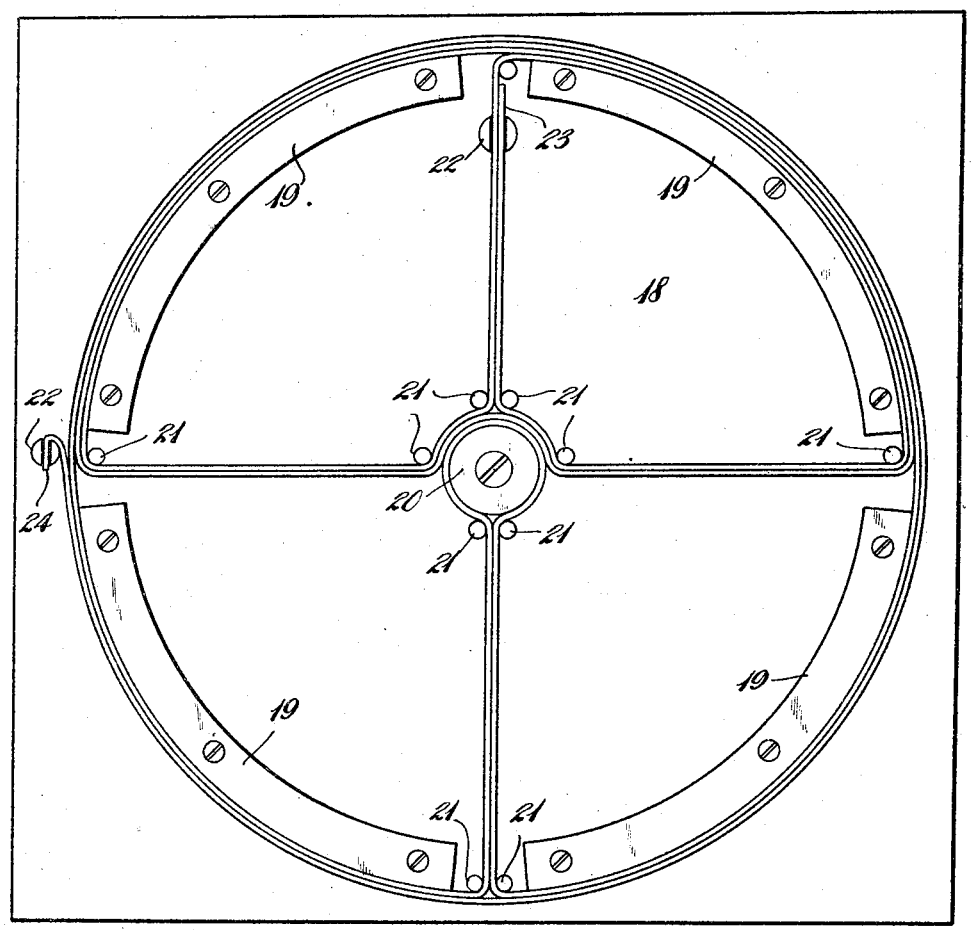
Fig. 3 is a plan view of the reinforcing structure, and the form on which it is built, showing the preferred method of making the reinforcing structure.

Referring to the drawings, 10 is the rim, 11, 11 the spokes, and 12 the hub portion of a steering wheel comprising a unitary structure of molded composition such as hard rubber or the like, and 13 is a unitary, laminated, reinforcing structure molded into the rim, spoke, and hub portions of the wheel. An additional reinforcement comprising a generally cylindrical structure 14 of cast metal is molded into the hub portion of the wheel and suitably secured to the laminated structure 13.

The laminated reinforcement 13 preferably comprises a single strip or ribbon of metal which is wound in a geometric figure comprising an annular rim portion 13ª, radial spoke portions 13ᵇ, 13ᵇ, and an annular hub portion 13ᶜ, the respective portions being integral with each other as parts of a single bent strip of material. The arrangement is such that every part of the structure comprises at least two plies of material, while some parts have three or four plies, due to the particular method of manufacture, the strip material used being of such strength that two plies are sufficient to impart the necessary rigidity to the wheel. The respective plies are bonded together at various parts of the structure, preferably by spot welding, as indicated at 15, 15, Fig. 1.

The hub-reinforcement 14 is formed adjacent its upper end with a radial flange 16, and is provided with a collar or nut 17 threaded onto its structure from the opposite end, said nut being adapted to clamp the hub-portion 13ᶜ of the reinforcement structure 13 against the flange 16 when the structure 13 is mounted upon the hub member 14.

The apparatus for making the reinforcement structure 13 is best shown in Fig. 3 wherein 18 is a flat support or table upon which is mounted a plurality of concentric, arcuate, spaced-apart guides or flanges 19, 19, a cylindrical axial guide 20, a plurality of suitably-positioned upstanding pegs or studs 21, 21, and a pair of slotted studs 22, 22 suitably positioned upon the table 18 to provide anchorages for the respective ends of the metal strip or ribbon from which the structure 13 is made.

In the manufacture of the reinforcing structure 13, the leading end 23 of the metal strip or ribbon is mounted in the slot of a stud 22 which is positioned adjacent the space between two guides 19 and between said space and the axial guide 20. The strip is then bent progressively around respective studs 21, and guides 19 and 20, in the manner illustrated in Fig. 3, until the reinforcement structure is completely assembled as shown, the strip being continuous throughout all portions of the structure, and providing at least two plies in all parts thereof. The trailing end 24 of the metal strip may be temporarily secured in a slotted stud 22 suitably positioned at the outer periphery of the assembled structure, as shown. If the reinforcement is made from a strip of material of long length it may now be severed therefrom. The plies of the reinforcement structure are then bonded together, preferably by spot welding as indicated at 15, 15, Fig. 1, either before or after its removal from its building form.

Next the structure 13 is assembled with the hub reinforcement 14 by having its hub portion clamped thereon between the hub-flange 16 and the threaded nut 17. If the steering wheel is of the type which has its hub portion at one side of the plane of its rim, the structure 13 may be so shaped, either before or after assembling with the hub member 14, by heat-treating and then pressing to the shape desired. The reinforcement structure is then incorporated in the steering wheel structure during the molding thereof.

The invention provides a steering wheel with a sturdy, one-piece, laminated reinforcing structure which may be made without waste of raw material.

Figure 4:
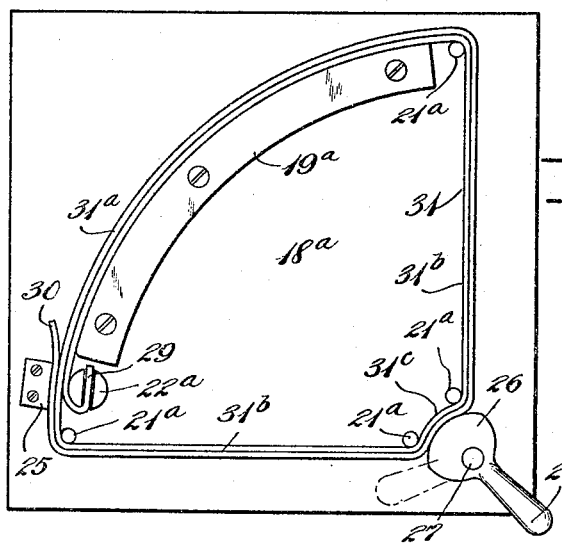
Fig. 4 is a view showing a modified reinforcing structure, the form on which it is built, and the method of making said structure.

In the modification shown in Fig. 4, the apparatus utilized comprises a table or support 18$^a$, a single arcuate flange or guide 19$^a$ mounted thereon, a plurality of suitably positioned upstanding pegs or studs 21$^a$, 21$^a$ mounted thereon, a slotted stud 22$^a$ suitably positioned thereon to engage the leading end of the metal strip or ribbon, and a block 25 adjacent the stud 22$^a$ for confining the trailing end of the metal strip. A cam 26 is eccentrically pivoted at 27 on the table 18$^a$, substantially at the axis of the guide 19$^a$, and is provided with a handle 28 for manual operation.

With the cam 26 in the inoperative position indicated by the dotted-line position of the handle 28, the metal strip is wound upon the modified apparatus in a manner similar to the method employed in the preferred embodiment of the invention, the leading end 29 of the strip being anchored in the slot of the stud 22$^a$ and the trailing end 30 of the strip being confined between the block 25 and the body of the assembled reinforcing structure, herein designated 31, said structure being uniformly of two plies thickness. The arrangement of the guide 19$^a$ and studs 21$^a$ is such that the structure 31 defines a sector of which 31$^a$ is the arcuate outer peripheral portion and 31$^b$, 31$^b$ the respective radial portions.

The cam-handle 28 may then be turned to its full-line position of Fig. 4 to cause the cam 26 to bend the structure 31 in a reverse curve 31$^c$ at the juncture of the radial portions 31$^b$, said curve 31$^c$ being concentric with the arcuate portion 31$^a$ of the sector. The plies of the sector 31 may be bonded together as by spot-welding. A plurality of the sectors 31 are assembled to form a wheel-reinforcing structure and incorporated in a molded steering wheel during the molding thereof. If desired the respective sectors may be welded to each other, and the assembled reinforcing structure may be distorted to position its hub-portion to one side of the plane of its rim-portion in the manner of the preferred embodiment, before it is molded into the wheel structure.

Other modifications are possible within the scope of the appended claims.

I claim:

1. A steering wheel comprising a body structure of molded material, and an internal reinforcement therein comprising a laminated structure composed of a single piece of material.

2. A steering wheel comprising a body structure of molded material, and an internal reinforcement therein comprising integral rim, spoke and hub portions, all of said portions being laminated.

3. A steering wheel comprising a body structure of molded material, and an internal reinforcement therein comprising a single strip of metal which is so bent and folded upon itself as to provide integral, laminated rim, spoke and hub portions.

4. A steering wheel as defined in claim 3 in which the laminations of the reinforcing structure are of metal and are bonded together by metal.

5. A steering wheel comprising a body structure of molded material, an internal reinforcement therein comprising a laminated, integral rim, spoke, and hub structure, and a hub-reinforcement member secured in the hub portion of said reinforcement structure.

In witness whereof I have hereunto set my hand this 5th day of December, 1928.

ENOCH KARRER.